United States Patent
Han et al.

(10) Patent No.: US 9,066,395 B2
(45) Date of Patent: Jun. 23, 2015

(54) POWER SUPPLY DEVICE AND CONTROL CIRCUIT THEREOF

(71) Applicants: SAMSUNG ELECTRO-MECHANICS CO., LTD., Suwon, Gyunggi-do (KR); University of Seoul Industry Cooperation Foundation, Seoul (KR)

(72) Inventors: Dae Hoon Han, Gyunggi-do (KR); Seo Hyung Kim, Gyunggi-do (KR); Seung Ryung Ryu, Jeollanam-do (KR); Joong Ho Choi, Gyunggi-do (KR); Joo Hyung Lee, Seoul (KR); Hong Jin Kim, Seoul (KR); Jae Shin Lee, Gyunggi-do (KR); Kang Yoon Lee, Seoul (KR)

(73) Assignees: SAMSUNG ELECTRO-MECHANICS CO., LTD., Suwon-Si, Gyeonggi-Do (KR); UNIVERSITY OF SEOUL INDUSTRY COOPERATION FOUNDATION, Seoul (KR)

( * ) Notice: Subject to any disclaimer, the term of this patent is extended or adjusted under 35 U.S.C. 154(b) by 0 days.

(21) Appl. No.: 14/063,983

(22) Filed: Oct. 25, 2013

(65) Prior Publication Data

US 2015/0002044 A1    Jan. 1, 2015

(30) Foreign Application Priority Data

Jun. 28, 2013   (KR) .......................... 10-2013-0076024

(51) Int. Cl.
  *H05B 33/08* (2006.01)
  *G05F 1/613* (2006.01)
  *H05B 37/02* (2006.01)

(52) U.S. Cl.
  CPC ........ *H05B 33/0815* (2013.01); *H05B 33/0818* (2013.01); *H05B 37/02* (2013.01)

(58) Field of Classification Search
  CPC ........... H05B 33/0815; H05B 41/3927; H05B 41/2828; H05B 33/0818; H05B 41/2824; H05B 33/0851; H05B 41/245; H05B 33/0824; H05B 41/2822; H05B 41/2827; H05B 37/02; G09G 3/3406
  USPC ............. 315/122, 152, 165, 197, 185 R, 192, 315/219, 247, 287, 297, 223, 209 R, 212, 315/214, 217, 307, 308; 363/15, 16, 18, 363/21.02, 25, 49; 323/224, 283, 285, 287
  See application file for complete search history.

(56) References Cited

U.S. PATENT DOCUMENTS

| | | | |
|---|---|---|---|
| 8,508,157 B2 * | 8/2013 | Kim et al. | 315/308 |
| 8,581,515 B2 * | 11/2013 | Han et al. | 315/297 |
| 2012/0007512 A1 | 1/2012 | Kim et al. | |
| 2012/0146530 A1 | 6/2012 | Han et al. | |
| 2012/0153848 A1 | 6/2012 | Shin et al. | |

FOREIGN PATENT DOCUMENTS

| | | |
|---|---|---|
| KR | 10-2012-0006392 A | 1/2012 |
| KR | 10-2012-0065655 A | 6/2012 |
| KR | 10-2012-0070266 A | 6/2012 |

* cited by examiner

*Primary Examiner* — Vibol Tan
(74) *Attorney, Agent, or Firm* — McDermott Will & Emery LLP

(57) ABSTRACT

There are provided a power supply device switching power input to a primary side to supply the power to a predetermined load connected to a secondary side electrically insulated from the primary side and a control circuit thereof. The control circuit generates a predetermined PWM signal to apply the PWM signal to a dimming switch connected to an end of the load and controls a switching frequency of the primary side, based on a control voltage generated according to a feedback signal according to the power supplied to the load and the PWM signal, and the control voltage maintains a constant difference between a minimum voltage level and a maximum voltage level regardless of a duty of the PWM signal.

12 Claims, 8 Drawing Sheets

US 9,066,395 B2

POWER SUPPLY DEVICE AND CONTROL CIRCUIT THEREOF

CROSS-REFERENCE TO RELATED APPLICATION

This application claims the priority of Korean Patent Application No. 10-2013-0076024 filed on Jun. 28, 2013, with the Korean Intellectual Property Office, the disclosure of which is incorporated herein by reference.

BACKGROUND OF THE INVENTION

1. Field of the Invention

The present invention relates to a power supply device having multiple outputs and supplying power to a light emitting diode (LED) and a control circuit thereof.

2. Description of the Related Art

Recently, in the field of displays, display devices using cathode ray tubes (CRT) have been replaced by flat panel display (FPD) devices reflecting consumer demand for features such as high resolution, large screens, and the like.

Particularly, in the case of large display devices, the use of liquid crystal display (LCD) devices has rapidly increased, due to advantages thereof in terms of lightness and slimness and such displays have come to play a leading role in the field of displays) in view of the cost and marketability thereof.

Meanwhile, in existing liquid crystal display (LCD) devices, cold cathode fluorescent lamps (CCFLs) have mainly been used as backlight light sources. However, recently, light emitting diodes (LEDs) have gradually come to be used as backlight light sources, due to various advantages thereof, such as low power consumption, a relatively long effective lifespan, environmental friendliness, and the like.

In order to drive a light emitting diode, a power supply circuit converting commercially-available alternating current (AC) power into direct current (DC) power and a driving circuit controlling the supplying of the DC power to the light emitting diode are generally used.

The power supply circuit may be classified as having a primary side and a secondary side, based on a transformer provided therein, in order to enhance an insulating function, wherein the primary side is configured of a circuit rectifying and smoothing the commercial AC power to switch the power, and the secondary side is configured of a circuit rectifying power transformed by the transformer and controlling a supply of the rectified power to a load.

That is, as disclosed in the following Related Art Document, generally, a power switching control circuit is formed on the primary side and the above-mentioned driving circuit is formed on the secondary side. In this configuration, in order to smoothly control switching of the power, information regarding a state of the power supplied to the light emitting diode should be feedbacked and the switching of the power should be controlled based on the information. To this end, a photo coupler having an insulating function to transfer a feedback current is mainly used. However, since the photo coupler is an optical device, signal transfer characteristics depend on photons, a use period, and a junction temperature, so that circuit design may be difficult and manufacturing costs increased due to the use of the photo coupler.

In order to solve these problems, the power switching control circuit and the driving circuit may be formed on the secondary side. However, in such a configuration using a scheme of receiving feedback information regarding a power state on the secondary side to control the switching on the secondary side, it is difficult to precisely control a switching frequency. Further, instead of not using the photo coupler, since a non-linear device such as a transistor for receiving and directly using the feedback information regarding the power state on the secondary side should be additionally used, manufacturing costs may still increase.

RELATED ART DOCUMENT (Patent Document 1) Korean Patent Laid-Open Publication No. 10-2012-0006392

SUMMARY OF THE INVENTION

An aspect of the present invention provides a power supply device capable of precisely controlling a switching frequency of a primary side on a secondary side by receiving feedback information regarding a power state on the secondary side without using a separate relatively expensive device or a relatively complicated circuit.

According to an aspect of the present invention, there is provided a control circuit of a power supply device for switching power input to a primary side to supply the power to a predetermined load connected to a secondary side electrically insulated from the primary side, wherein the control circuit generates a predetermined PWM signal to apply the PWM signal to a dimming switch connected to an end of the load and controls a switching frequency of the primary side, based on a control voltage generated according to a feedback signal according to the power supplied to the load and the PWM signal, and the control voltage maintains a constant difference between a minimum voltage level and a maximum voltage level regardless of a duty of the PWM signal.

The control circuit may include: a dimming unit applying the PWM signal to the dimming switch and generating the control voltage; a current generating unit generating a current whose amount is varied according to a level of the control voltage of the dimming unit; a signal generating unit generating a pulse signal having a frequency determined according to the current generated by the current generating unit; and a driving unit generating a switching control signal according to the pulse signal.

The current generating unit may include: a plurality of resistors; a first comparator comparing a preset first reference voltage with a voltage according to a current flowing in the plurality of resistors; a current adjusting switch adjusting an amount of the current flowing in the plurality of resistors according to an output signal of the first comparator; and a current mirror mirroring the current flowing in the plurality of resistors to transfer the mirrored current to the signal generating unit, wherein an amount of current flowing in at least one of the plurality of resistors may be varied according to the control voltage generated by the dimming unit.

The first comparator may include a non-inverting terminal to which the first reference voltage is applied; the current adjusting switch may include a transistor having a gate connected to an output terminal of the first comparator, a source connected to an inverting terminal of the first comparator, and a drain connected to the current mirror; part of the plurality of resistors may be provided between the inverting terminal of the first comparator and a ground, and the remainder of the plurality of resistors may be provided between the non-inverting terminal of the first comparator and an output node of the dimming unit.

The dimming unit may include: a PWM signal generator applying the PWM signal to the dimming switch; a second comparator comparing the feedback signal with a predetermined target power level; a first capacitor having one end connected to a ground and being charged with or discharged an output signal of the second comparator; a first switch disposed between an output terminal of the second comparator and the other end of the first capacitor; a voltage dividing unit including at least two resistors and dividing a charged voltage of the first capacitor; a third comparator comparing the charged voltage of the first capacitor with a preset second reference voltage; and a compensating unit adjusting resistance values of at least one of the at least two resistors according to an output signal of the third comparator, wherein the first switch may perform a switching operation by the PWM signal and the charged voltage of the first capacitor may be used as the control voltage.

The control circuit may further include a hetero-junction bipolar transistor having a base to which the charged voltage of the first capacitor is applied, a collector connected to a driving power terminal, and an emitter, wherein a voltage output by the emitter may be supplied to the voltage dividing unit.

The control circuit may further include a buffer buffering the voltage output by the emitter.

The signal generating unit may include: a second capacitor being charged with or discharged by the current output by the current generating unit; a charging-discharging switch disposed in parallel with the second capacitor; a first comparator comparing a preset third reference voltage with a charged voltage of the second capacitor to control switching of the charging-discharging switch; and a second comparator comparing the charged voltage of the second capacitor with a preset fourth reference voltage to generate the pulse signal.

According to another aspect of the present invention, there is provided a power supply device, including: a power supplying unit switching power input to a primary side to supply the power to a predetermined load connected to a secondary side electrically insulated from the primary side; and a controlling unit applying a predetermined PWM signal to a dimming switch connected to an end of the load and controlling a switching frequency of the primary side, based on a control voltage generated according to a feedback signal according to the power applied to the load and the PWM signal, wherein the control voltage maintains a constant difference between a minimum voltage level and a maximum voltage level, regardless of a duty of the PWM signal.

The power supplying unit may include: a switching unit including at least two switches connected between an input power terminal to which the input power is input and a ground in series to switch the input power; a transforming unit transforming a voltage level of the power switched by the switching unit; a first outputting unit stabilizing the power output by the transforming unit to output a preset first power; and a second outputting unit stabilizing the power output by the transforming unit to output a preset second power.

The transforming unit may include: a resonance tank providing an inductor-inductor-capacitor (LLC) resonance operation of the switching unit; and a transformer including a primary winding receiving the switched power from the switching unit, and a first secondary winding and a second secondary winding each having a preset turns ratio with respect to the primary winding and outputting the first power or the second power.

The power supplying unit may further include: a rectifying-smoothing unit rectifying and smoothing alternating current (AC) power; and a power factor correcting unit performing a power factor correction on direct current (DC) power from the rectifying-smoothing unit to supply the corrected DC power to the switching unit.

The first power may be supplied to at least one light emitting diode channel.

The controlling unit may control the switching frequency according to a power state of the power supplying unit to control a power state of the first power, and may control a switching duty to control a power state of the second power.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
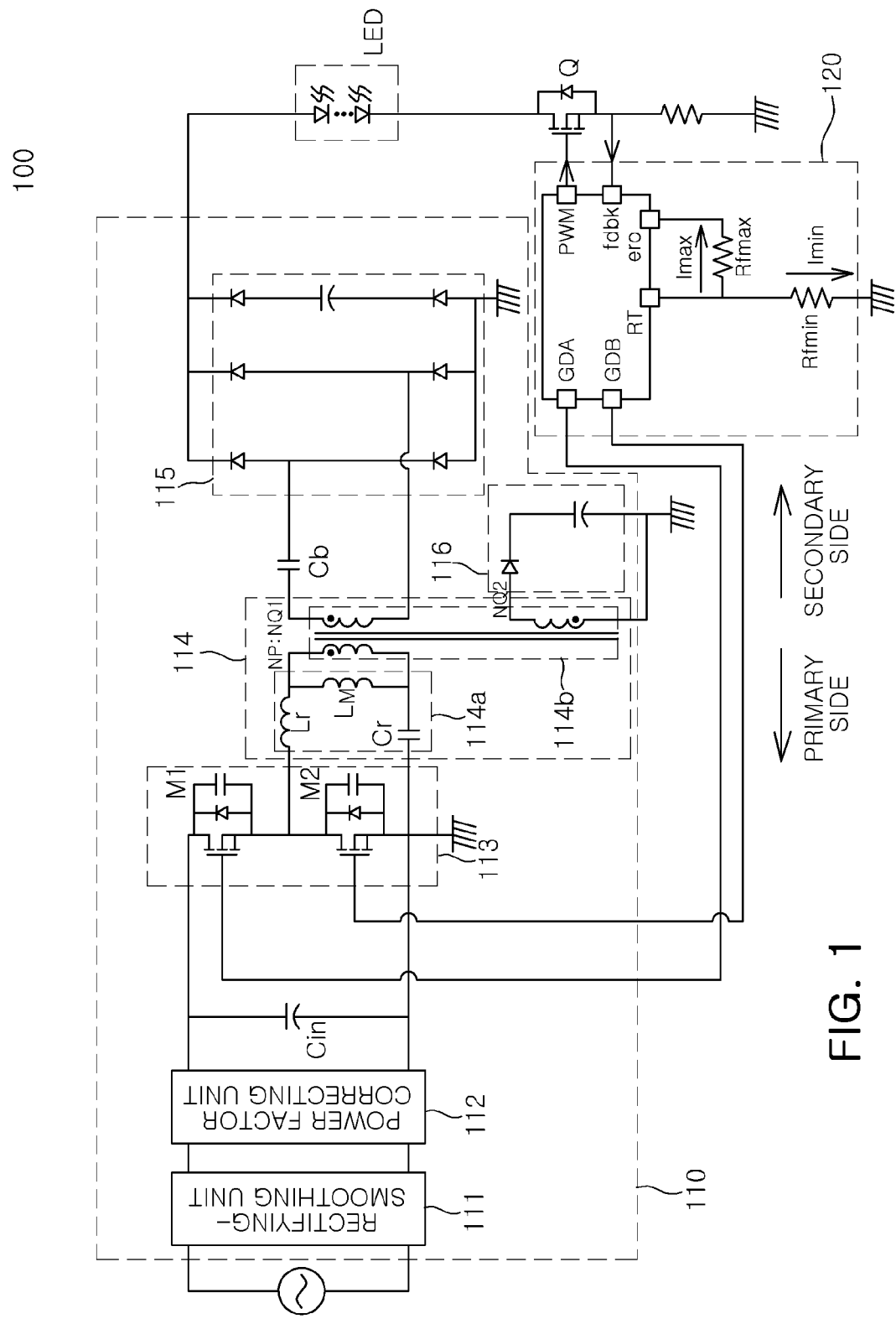
FIG. 1 is a circuit diagram schematically illustrating a power supply device according to an embodiment of the present invention.

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Throughout the drawings, the same or like reference numerals will be used to designate the same or like elements.

FIG. 1 is a circuit diagram schematically illustrating a power supply device according to an embodiment of the present invention. Referring to FIG. 1, a power supply device 100 according to the embodiment of the present invention may include a power supplying unit 110 and a controlling unit 120.

The power supplying unit 110 may include a switching unit 113, a transforming unit 114, and a first outputting unit 115, and may further include a rectifying-smoothing unit 111, a power factor correcting unit 112, and a second outputting unit 116.

The rectifying-smoothing unit 111 may rectify and smooth alternating current (AC) power to generate direct current (DC) power and transfer the DC power to the power factor correcting unit 112, and the power factor correcting unit 112 may adjust a phase difference between a voltage and a current of the DC power from the rectifying-smoothing unit 111 to correct a power factor.

The switching unit 113 may include at least two switches M1 and M2 stacked between an input power terminal to which the DC power from the power factor correcting unit 112 is input and a ground and perform a power conversion operation by alternately performing a switching operation using the switch M1 and the switch M2.

The transforming unit 114 may include a resonance tank 114a and a transformer 114b. The resonance tank 114a may provide an inductor-inductor-capacitor (Lr-Lm-Cr) (LLC) resonance operation. Here, one (Lm) of the inductors may be a magnetizing inductor of the transformer 114b.

The transformer 114b may include a primary winding P and secondary windings Q1 and Q2, and the primary winding P and the secondary windings Q1 and Q2 are electrically insulated from each other. That is, the primary winding P and the secondary windings Q1 and Q2 may have different electrical properties of the ground.

More specifically, the rectifying-smoothing unit 111, the power factor correcting unit 112, the switching unit 113, the resonance tank 114a, and the primary winding P of the transformer 114b may be formed on the primary side, and the secondary windings Q1 and Q2 of the transformer 114b, the first and second outputting units 115 and 116, and the controlling unit 120 may be formed on the secondary side.

The primary winding P and the secondary windings Q1 and Q2 may have a preset turns ratio, and voltage levels in the secondary windings Q1 and Q2 may be varied according to the turns ratio and output power having the varied voltage level.

The first outputting unit 115 may rectify and stabilize a first power from a first secondary winding Q1 and supply the stabilized first power to a predetermined load, particularly, to at least one light emitting diode channel. The second outputting unit 116 may rectify and stabilize a second power from a second secondary winding Q2 and output the stabilized second power.

The controlling unit 120 may be formed on the secondary side and receive feedback information regarding a power state of the first outputting unit 115 to control a switching frequency of the switching unit 113 positioned on the primary side. More specifically, the first power of the first outputting unit 115 may be supplied to the load LED to apply a PWM signal to a dimming switch Q positioned between an end of the load LED and the ground, thereby adjusting a current flowing in the load LED, and a power level of the first power may be controlled by controlling the switching frequency of the switching unit 113 according to a feedback signal fdbk generated by detecting the current flowing in the load LED and the PWM signal.

In this case, the controlling unit 120 may provide switching control signals GDA and GDB controlling a minimum value and a maximum value of the switching frequency of the switching unit 113 based on currents flowing in first and second resistors Rfmin and Rfmax.

Meanwhile, the controlling unit 120 may control the switching frequency of the switching unit 113 to control a power level of the first power and may control a switching duty of the switching unit 113 to control a power level of the second power.

Since technology for controlling the power level of the first power by the switching frequency and controlling the power level of the second power by the switching duty using a single control circuit and a single switching circuit at the time of multiple outputs in the power supply device is well-known in the art, a detailed description thereof will be omitted.

Figure 2:
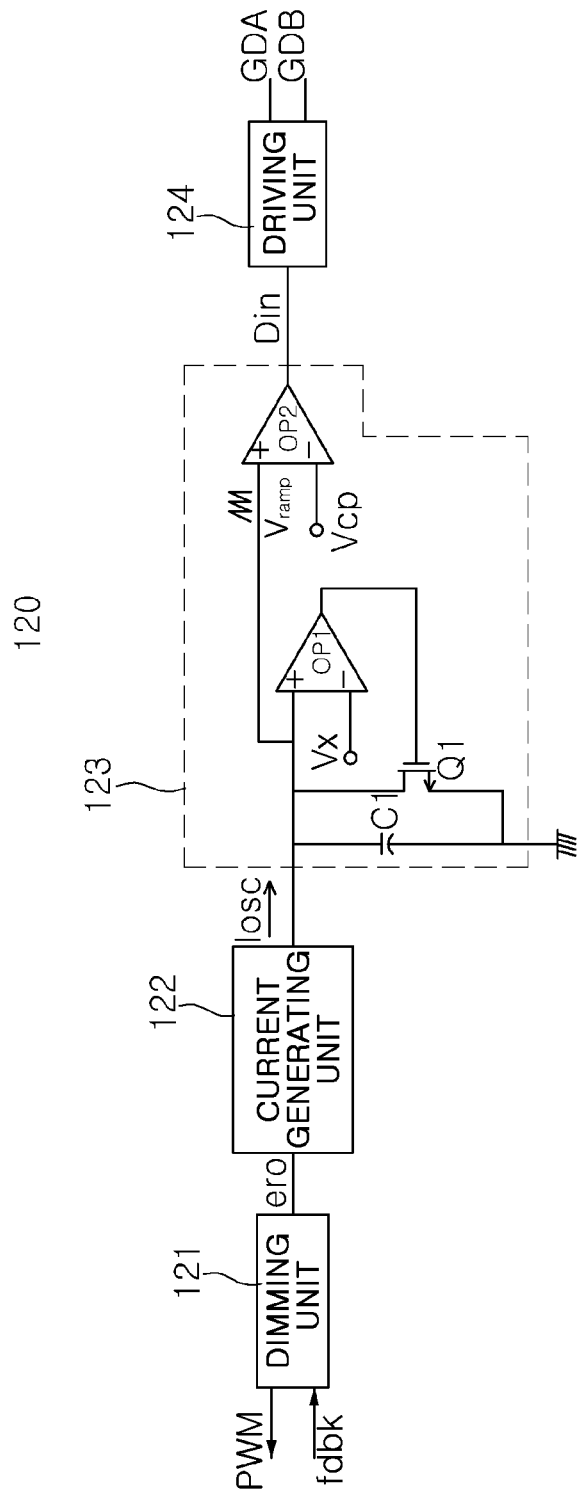
FIG. 2 is a circuit diagram schematically illustrating a controlling unit used in the power supply device according to the embodiment of the present invention.
Figure 3:
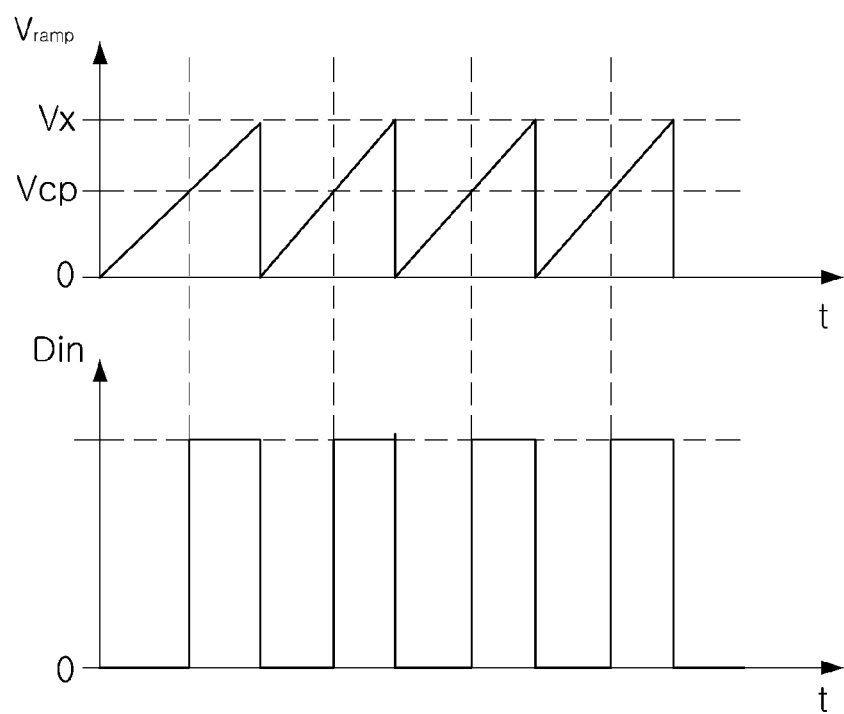
FIG. 3 is a graph illustrating signal waveforms of a signal generating unit used in the power supply device according to the embodiment of the present invention.

FIG. 2 is a circuit diagram schematically illustrating a controlling unit used in the power supply device according to the embodiment of the present invention, and FIG. 3 is a graph illustrating signal waveforms of a signal generating unit used in the power supply device according to the embodiment of the present invention.

Referring to FIG. 2, the controlling unit 120 may include a dimming unit 121, the first and second resistors Rfmin and Rfmax, a current generating unit 122, a signal generating unit 123, and a driving unit 124.

The dimming unit 121 may include a PWM signal generating circuit to apply a PWM signal to the dimming switch Q positioned between the end of the load LED of the secondary side and the ground, thereby adjusting a current flowing in the load LED. In addition, the dimming unit 121 is connected to the current generating unit 122 through a node ero and adjusts a voltage Vero of the node ero according to the PWM signal and a feedback signal fdbk.

The current generating unit 122 may include the first and second resistors Rfmin and Rfmax shown in FIG. 1 and may transfer a current Iosc generated by mirroring the current flowing in the first and the second resistors Rfmin and Rfmax to the signal generating unit 123.

A detailed configuration and operation of the dimming unit 121 and the current generating unit 122 will be described below.

The signal generating unit 123 may include a capacitor C1, a charging-discharging switch Q1, a first comparator op1, and a second comparator op2 and generate a saw-tooth signal according to a voltage charged in or discharged from the capacitor C1. More specifically, the capacitor C1 may be supplied with the current from the current generating unit 122 and be charged or discharged according to a switching operation of the charging-discharging switch Q1. In addition, the first comparator op1 may compare a preset reference voltage Vx with the voltage charged in the capacitor C1, and control switching of the charging-discharging switch Q1 according to the comparison result.

Therefore, the voltage level of the capacitor C1 may have a form such as a saw-tooth signal as shown in FIG. 3, and the second comparator op2 may compare the saw-tooth signal Vramp with a preset reference voltage Vcp and provide a pulse signal Din to the driving unit 124.

The driving unit 124 may provide switching control signals GDA and GDB capable of driving the switches M1 and M2 of the switching unit 113 based on the pulse signal Din from the second comparator op2. In this case, the switching control signal GDA may be the same signal as the pulse signal Din and the switching control signal GDB may correspond to a signal inverting the switching control signal GDB.

Meanwhile, a level of the current Iosc from the current generating unit 122 may control a time for which the current is charged in the capacitor C1. Therefore, frequencies of the switching control signals GDA and GDB may be controlled.

Figure 4:
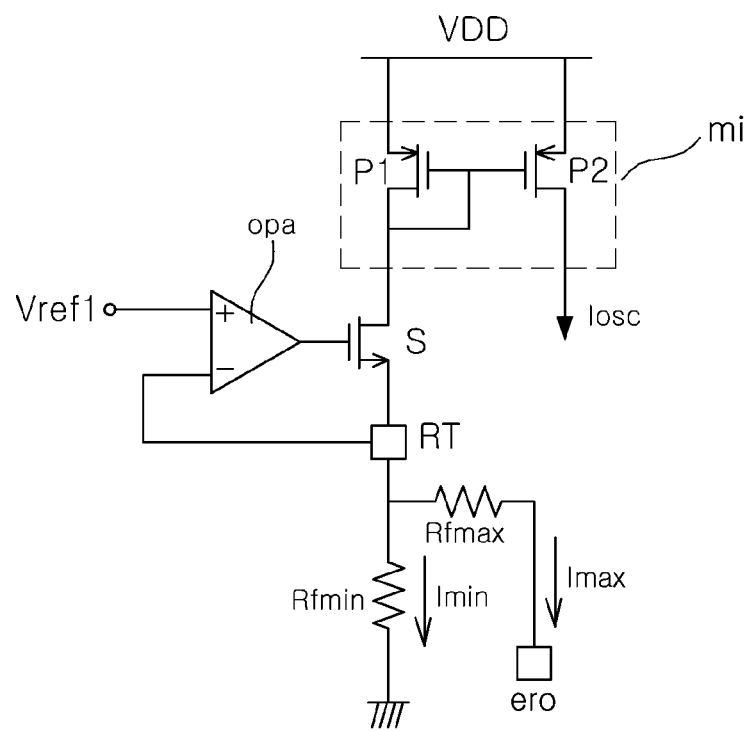
FIG. 4 is a circuit diagram schematically illustrating a current generating unit used in the power supply device according to the embodiment of the present invention.

FIG. 4 is a circuit diagram schematically illustrating a current generating unit used in the power supply device according to the embodiment of the present invention.

Referring to FIG. 4, the current generating unit 122 may include a current mirror mi configured of two transistors P1 and P2, a first comparator opa, a current adjusting switch S, and the first and second resistors Rfmin and Rfmax. The current mirror mi may mirror the currents flowing in the first and second resistors Rfmin and Rfmax and supply the mirrored currents to the signal generating unit 123.

Specifically, the first comparator opa may compare a preset first reference voltage Vref1 with a voltage (a voltage in a node RT) according to the currents flowing in the first and second resistors Rfmin and Rfmax and control a switching operation of the current adjusting switch S according to the comparison result to control the currents flowing in the first and second resistors Rfmin and Rfmax. Described in detail, when the voltage in the node RT is higher than the first reference voltage Vref1, an output voltage of the first comparator opa is decreased. Therefore, an amount of current flowing through the current adjusting switch S is decreased. Here, when the decreased current flows through the first and second resistors Rfmin and Rfmax, a voltage drop is generated and the voltage in the node RT is decreased. On the other hand, when the voltage in the node RT is lower than the first reference voltage Vref1, the output voltage of the first comparator opa is increased. Therefore, the amount of current flowing through the current adjusting switch S is increased. Here, the increased current flows through the first and second resistors Rfmin and Rfmax and the voltage in the node RT is increased.

Current Imin and Imax is generated due to the voltage in the node RT and the first and second resistors Rfmin and Rfmax, and an amount of current Imin and Imax varies according to magnitudes of the first and second resistors Rfmin and Rfmax. In this case, since the first resistor Rfmin is connected to the ground and the second resistor Rfmax is connected to the node ero, a total resistance value may be changed according to the voltage of the node ero and a total current amount may be varied accordingly.

Figure 5:
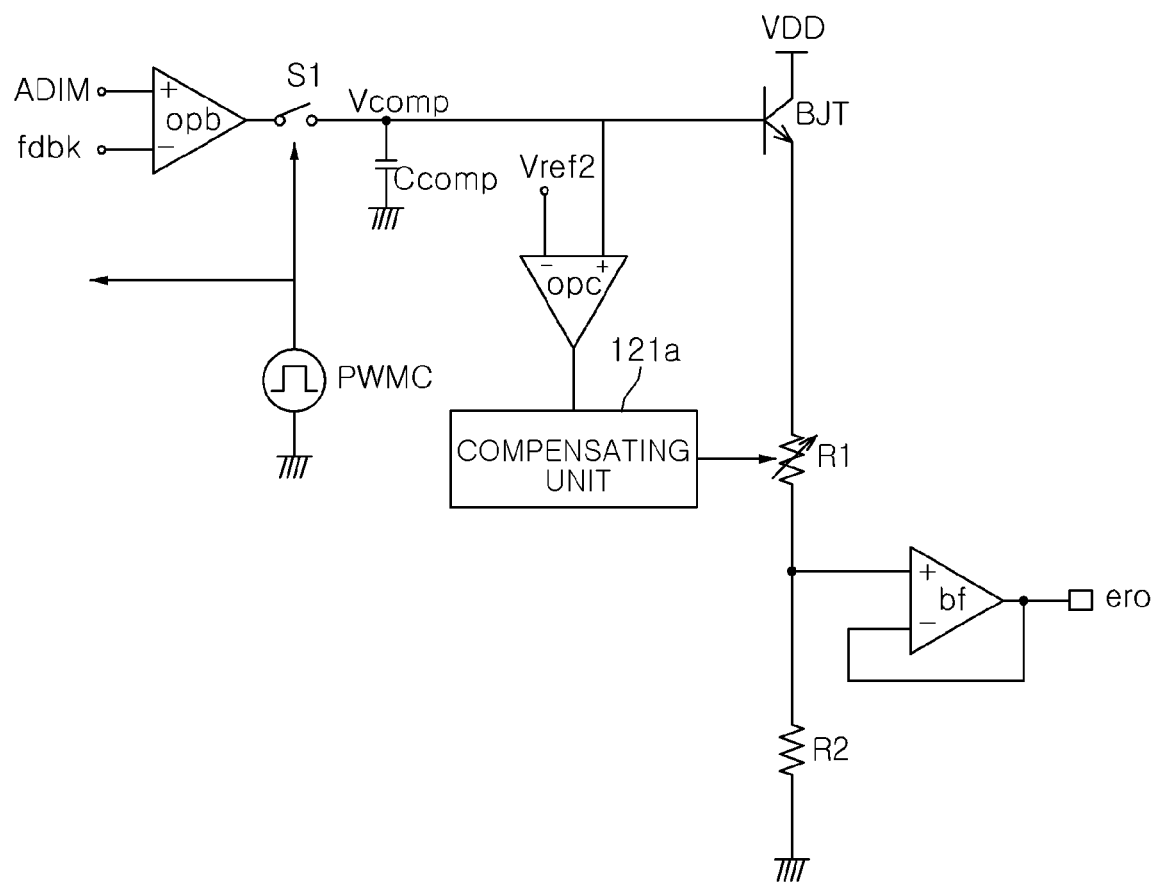
FIG. 5 is a circuit diagram schematically illustrating a dimming unit used in the power supply device according to the embodiment of the present invention.

FIG. 5 is a circuit diagram schematically illustrating a dimming unit used in the power supply device according to the embodiment of the present invention. As shown in FIG. 5, the dimming unit 121 may include a second comparator opb, a third comparator opc, a switch S1, a capacitor Ccomp, an inverter INV, a PWM signal generator PWMC, and two resistors R1 and R2, and may further include a hetero-junction bipolar transistor (BJT) and a buffer bf. In FIG. 5, the resistor R1 is illustrated as a variable resistor, but the resistor R2 rather than the resistor R1 may be a variable resistor. Alternatively, both the resistors R1 and R2 may be variable resistors.

The following description is made by assuming that when a PWM signal generated by the PWM signal generator PWMC is at a high level, the switch S1 is turned-on and when the PWM signal is at a low level, the switch S1 is turned-off.

When the PWM signal is at the high level, the second comparator opb compares a target power level ADIM with a feedback signal fdbk detected from a current flowing in the load LED, and the capacitor Ccomp is charged according to the comparison result to generate a voltage Vcomp. The voltage Vcomp is transferred to the resistors R1 and R2 through the hetero-junction bipolar transistor (BJT) having an emitter follower structure and a voltage divided by the resistors R1 and R2 is buffered by the buffer bf to be provided to the node ero. By configuring the hetero-junction bipolar transistor (BJT) as the emitter follower structure, an influence of noise introduced through the ground on the voltage Vcomp may be minimized.

Figure 6:
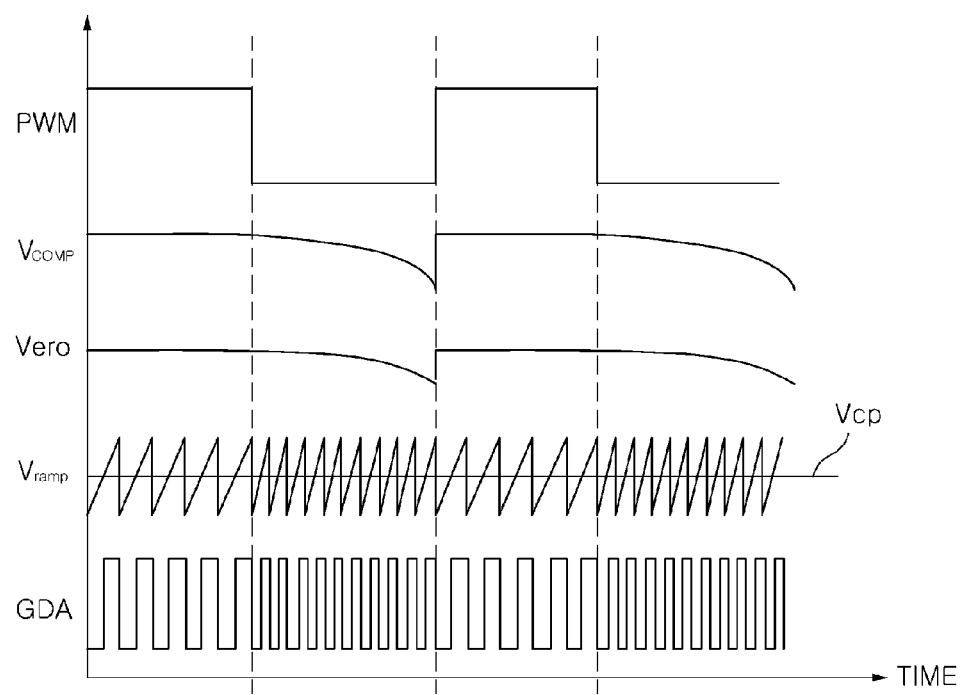
FIG. 6 is a graph illustrating signal waveforms of main components used in the power supply device according to the embodiment of the present invention.

More specifically, with reference to FIGS. 5 and 6, when a level of the feedback signal fdbk is lower than the target power level ADIM, a level of the voltage Vcomp is increased according to the comparison result of the second comparator opb. Therefore, a voltage level Vero of an output terminal of the buffer b1 is increased. Since the current Imin flowing in the first resistor Rfmin is fixed, the current Imax flowing in the second resistor Rfmax is gradually decreased, such that frequencies of the switching control signals GDA and GDB may be slowed and a voltage level of the first power may be increased.

On the contrary, when the level of the feedback signal fdbk is higher than the target power level ADIM, the level of the voltage Vcomp is decreased according to the comparison result of the second comparator opb, such that the voltage level Vero of the output terminal of the buffer b1 may also be decreased. Therefore, the current Imax flowing in the second resistor Rfmax is gradually increased, such that the frequencies of the switching control signals GDA and GDB may be sped up and the voltage level of the first power may be decreased. The above-mentioned operations are repeated, so that a target output voltage of the first power may be regulated.

When the PWM signal is at a low level, the current does not flow in the load LED, such that the voltage level of the first power may be increased. In order to decrease the voltage level of the first power, the switch S1 is turned-off and the capacitor Ccomp is slowly discharged, such that the level of the voltage Vcomp is slowly decreased. As the voltage Vcomp is slowly decreased, the voltage Vero is decreased and the frequencies of the switching control signals GDA and GDB become fast, such that the voltage level of the first power may be decreased.

Figure 7:
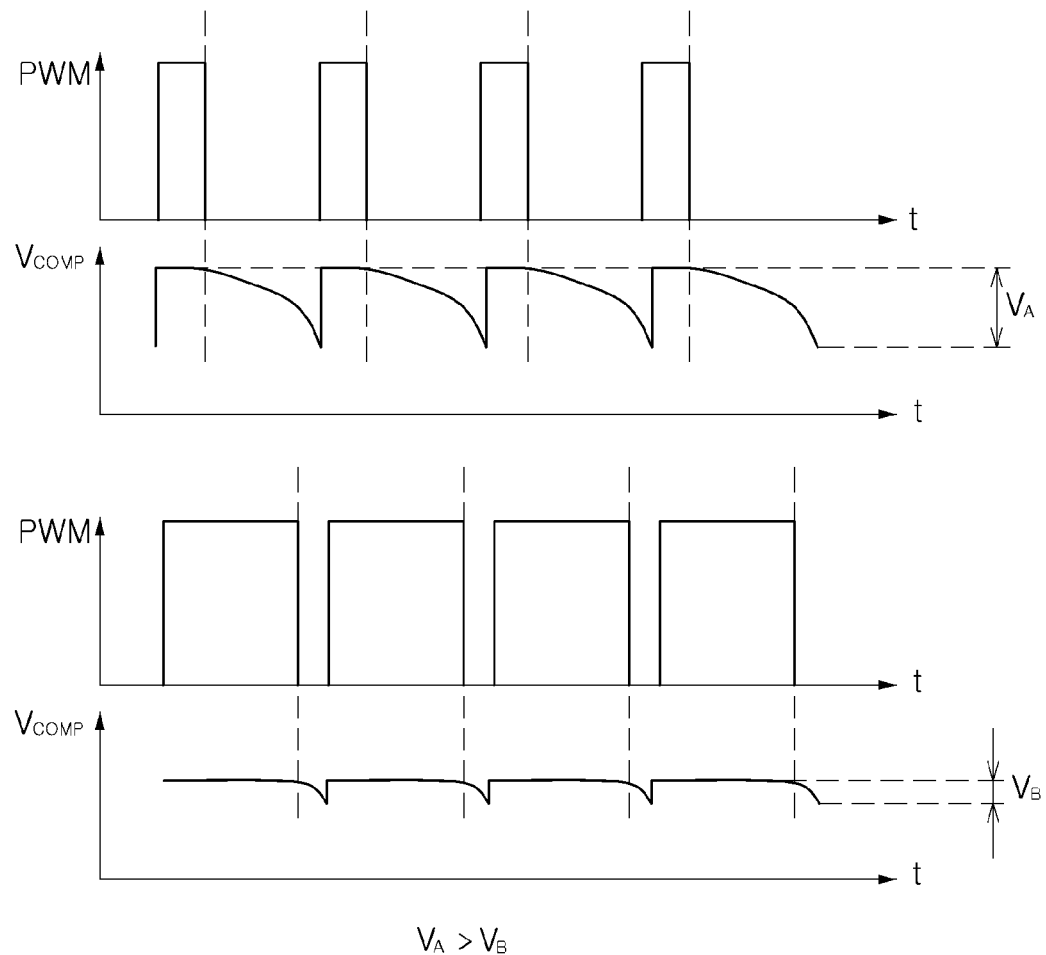
FIGS. 7 and 8 are simulation data for describing an effect of the power supply device according to the embodiment of the present invention.

Meanwhile, when the PWM signal is at the low level, the switch S1 is turned-off and the voltage Vcomp is decreased. Here, when a duty of the PWM signal is changed, a low level interval is changed, such that a difference in dropped voltage level is generated as shown in FIG. 7. When the above-mentioned voltage drop is significant, the frequencies of the switching control signals GDA and GDB may be significantly changed. As a result, the voltage level of the first power is also changed, such that it may be deviated from a specification required from a system.

Figure 8:
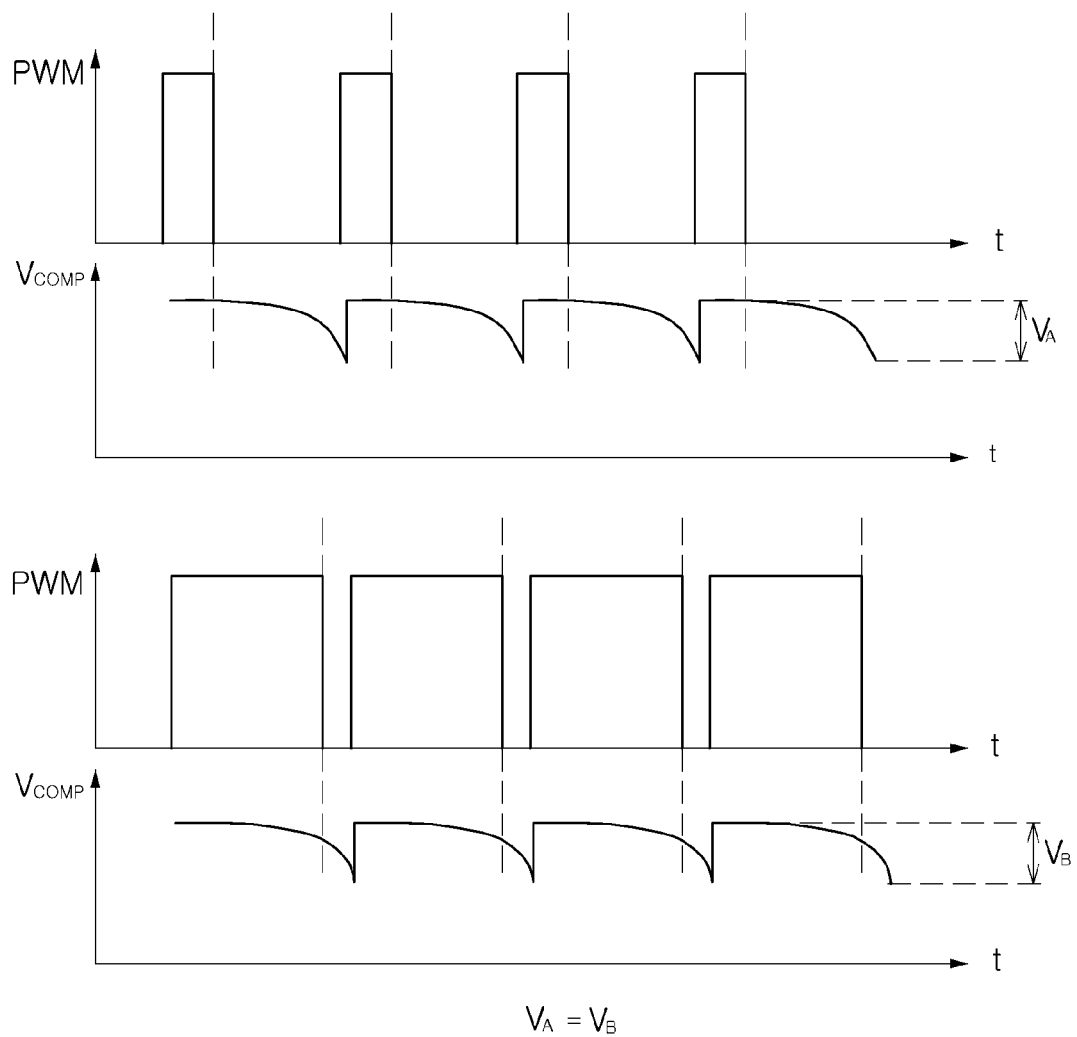

According to the embodiment of the invention, the above-mentioned problems are solved using the third comparator opc and a compensating unit 121a. The third comparator opc compares a predetermined second reference voltage Vref2 with the voltage Vcomp to detect whether the voltage Vcomp is decreased. When the level of the voltage Vcomp is lower than the second reference voltage Vref2, an up signal for increasing the voltage Vcomp is output and the compensating unit 121a adjusts a resistance value of the resistor R1 according to the up signal to increase a voltage output by a connection node between the resistors R1 and R2. Therefore, as shown in FIG. 8, when the PWM signal is at the low level, a variation amount of the voltage Vero may be constantly maintained, regardless of the duty of the PWM signal.

As set forth above, according to embodiments of the present invention, a switching frequency of a primary side on a secondary side is controlled using an external resistor without using a separate, relatively expensive device or a complicated circuit, whereby a circuit may be simplified and a manufacturing cost thereof may be decreased.

While the present invention has been shown and described in connection with the embodiments, it will be apparent to those skilled in the art that modifications and variations can be made without departing from the spirit and scope of the invention as defined by the appended claims.

What is claimed is:
1. A control circuit of a power supply device for switching power input to a primary side to supply the power to a predetermined load connected to a secondary side electrically insulated from the primary side,
    wherein the control circuit generates a predetermined PWM signal to apply the PWM signal to a dimming switch connected to an end of the load and controls a switching frequency of the primary side, based on a control voltage generated according to a feedback signal according to the power supplied to the load and the PWM signal, and the control voltage maintains a constant difference between a minimum voltage level and a maximum voltage level regardless of a duty of the PWM signal, wherein the control circuit comprises:
- a dimming unit applying the PWM signal to the dimming switch and generating the control voltage;
- a current generating unit generating a current whose amount is varied according to a level of the control voltage of the dimming unit;
- a signal generating unit generating a pulse signal having a frequency determined according to the current generated by the current generating unit; and
- a driving unit generating a switching control signal according to the pulse signal.

2. The control circuit of claim 1, wherein the current generating unit includes:
- a plurality of resistors;
- a first comparator comparing a preset first reference voltage with a voltage according to a current flowing in the plurality of resistors;
- a current adjusting switch adjusting an amount of the current flowing in the plurality of resistors according to an output signal of the first comparator; and
- a current mirror mirroring the current flowing in the plurality of resistors to transfer the mirrored current to the signal generating unit,
wherein an amount of current flowing in at least one of the plurality of resistors is varied according to the control voltage generated by the dimming unit.

3. The control circuit of claim 2, wherein the first comparator includes a non-inverting terminal to which the first reference voltage is applied;
- the current adjusting switch includes a transistor having a gate connected to an output terminal of the first comparator, a source connected to an inverting terminal of the first comparator, and a drain connected to the current mirror;
- part of the plurality of resistors are provided between the inverting terminal of the first comparator and a ground, and
- the remainder of the plurality of resistors are provided between the non-inverting terminal of the first comparator and an output node of the dimming unit.

4. The control circuit of claim 1, wherein the dimming unit includes:
- a PWM signal generator applying the PWM signal to the dimming switch;
- a second comparator comparing the feedback signal with a predetermined target power level;
- a first capacitor having one end connected to a ground and being charged with or discharged an output signal of the second comparator;
- a first switch disposed between an output terminal of the second comparator and the other end of the first capacitor;
- a voltage dividing unit including at least two resistors and dividing a charged voltage of the first capacitor;
- a third comparator comparing the charged voltage of the first capacitor with a preset second reference voltage; and
- a compensating unit adjusting resistance values of at least one of the at least two resistors according to an output signal of the third comparator,
wherein the first switch performs a switching operation by the PWM signal and the charged voltage of the first capacitor is used as the control voltage.

5. The control circuit of claim 4, further comprising a hetero-junction bipolar transistor having a base to which the charged voltage of the first capacitor is applied, a collector connected to a driving power terminal, and an emitter,
wherein a voltage output by the emitter is supplied to the voltage dividing unit.

6. The control circuit of claim 5, further comprising a buffer buffering the voltage output by the emitter.

7. The control circuit of claim 1, wherein the signal generating unit includes:
- a second capacitor being charged with or discharged by the current output by the current generating unit;
- a charging-discharging switch disposed in parallel with the second capacitor;
- a first comparator comparing a preset third reference voltage with a charged voltage of the second capacitor to control switching of the charging-discharging switch; and
- a second comparator comparing the charged voltage of the second capacitor with a preset fourth reference voltage to generate the pulse signal.

8. A power supply device, comprising:
- a power supplying unit switching power input to a primary side to supply the power to a predetermined load connected to a secondary side electrically insulated from the primary side; and
- a controlling unit applying a predetermined PWM signal to a dimming switch connected to an end of the load and controlling a switching frequency of the primary side, based on a control voltage generated according to a feedback signal according to the power applied to the load and the PWM signal,
wherein the control voltage maintains a constant difference between a minimum voltage level and a maximum voltage level, regardless of a duty of the PWM signal, and
wherein the power supplying unit includes:
- a switching unit including at least two switches connected between an input power terminal to which the input power is input and a ground in series to switch the input power;
- a transforming unit transforming a voltage level of the power switched by the switching unit;
- a first outputting unit stabilizing the power output by the transforming unit to output a preset first power; and
- a second outputting unit stabilizing the power output by the transforming unit to output a preset second power.

9. The power supply device of claim 8, wherein the transforming unit includes:
- a resonance tank providing an inductor-inductor-capacitor (LLC) resonance operation of the switching unit; and
- a transformer including a primary winding receiving the switched power from the switching unit, and a first secondary winding and a second secondary winding each having a preset turns ratio with respect to the primary winding and outputting the first power or the second power.

10. The power supply device of claim 8, wherein the power supplying unit further includes:
- a rectifying-smoothing unit rectifying and smoothing alternating current (AC) power; and
- a power factor correcting unit performing a power factor correction on direct current (DC) power from the rectifying-smoothing unit to supply the corrected DC power to the switching unit.

11. The power supply device of claim 8, wherein the first power is supplied to at least one light emitting diode channel.

12. The power supply device of claim 8, wherein the controlling unit controls the switching frequency according to a power state of the power supplying unit to control a power state of the first power, and controls a switching duty to control a power state of the second power.

\* \* \* \* \*